Figure 1:
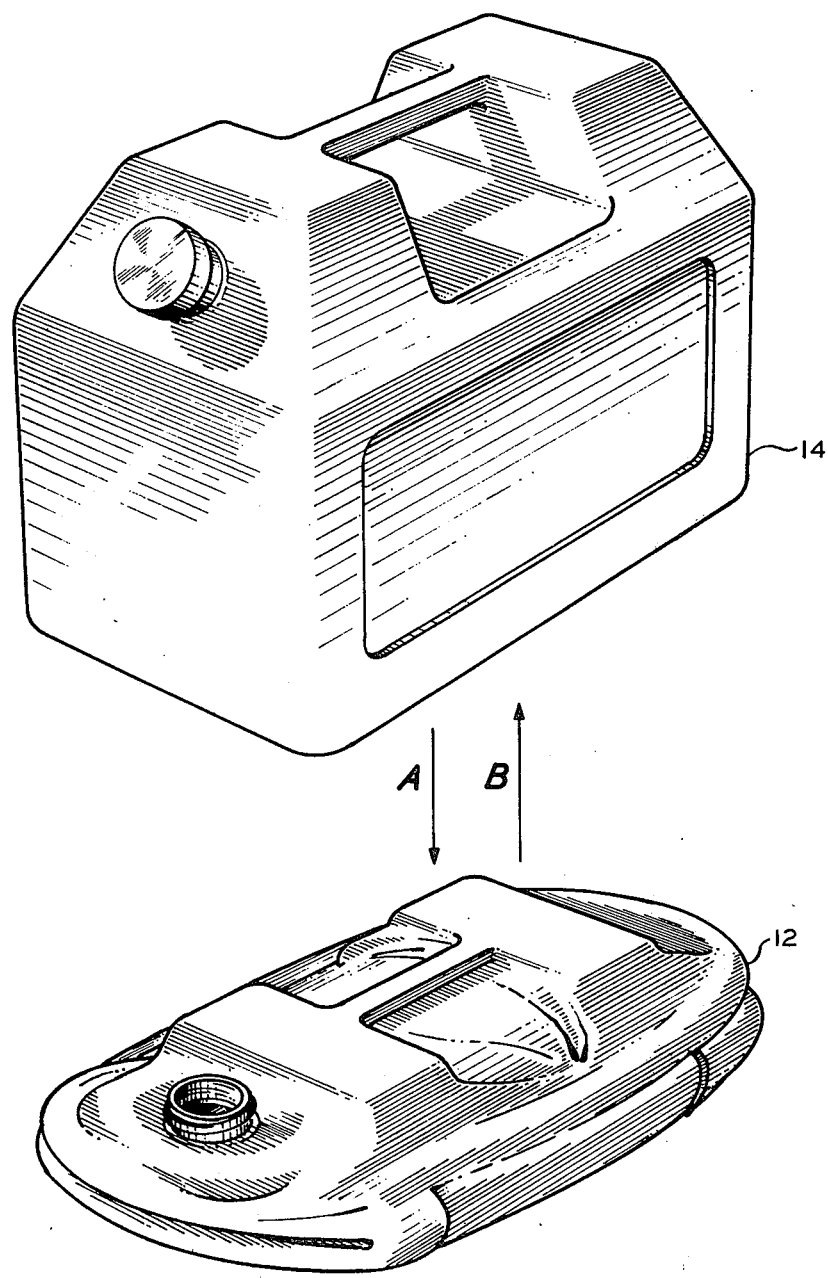

United States Patent [19]
Carrow

[11] 3,984,516
[45] Oct. 5, 1976

[54] REFORMING COLLAPSIBLE CROSSLINKED THERMOPLASTIC ARTICLES

[75] Inventor: Guy E. Carrow, Bartlesville, Okla.

[73] Assignee: Phillips Petroleum Company, Bartlesville, Okla.

[22] Filed: Nov. 11, 1974

[21] Appl. No.: 522,594

Related U.S. Application Data

[63] Continuation of Ser. No. 320,503, Jan. 2, 1973, abandoned.

[52] U.S. Cl. .................................. 264/230; 53/35; 264/92; 264/294
[51] Int. Cl.² ........................................ B29C 17/03
[58] Field of Search ................ 264/294, 230, 92

[56] References Cited
UNITED STATES PATENTS

| 2,889,651 | 6/1959 | Baldanza | 264/92 |
| 3,201,503 | 8/1965 | Benning | 264/230 X |
| 3,220,544 | 11/1965 | Lovell | 264/292 X |
| 3,270,104 | 8/1966 | Dreyfus | 264/92 |
| 3,597,372 | 8/1971 | Cook | 264/230 X |
| 3,611,669 | 10/1971 | Shepherd | 264/230 X |
| 3,872,194 | 3/1975 | Lowry | 264/22 |

Primary Examiner—Richard R. Kucia

[57] ABSTRACT

A process for reforming a crosslinked thermoplastic article is described which comprises forming a crosslinkable polymer containing a crosslinking agent into a first shaped article, and thereafter reforming the first shaped article into a second shaped article. An improved material handling process is also described which comprises the optional employment of the first or second or any subsequently shaped article in the form of a container. The containers can be reformed into various shapes by suitably regulating the reforming temperature conditions.

17 Claims, 2 Drawing Figures

REFORMING COLLAPSIBLE CROSSLINKED THERMOPLASTIC ARTICLES

This is a continuation of my copending application Ser. No. 320,503, filed Jan. 2, 1973, now abandoned.

This invention relates to a reshapable article of manufacture, a process of reforming an article of manufacture, and the use of the reformed article in an improved material handling process.

Many well-known articles having a wide variety of shapes and forms can be conveniently prepared from plastic materials by means of suitable molding and crosslinking techniques. Heretofore, the art has been unable to reform cross-linked plastic articles, again and again, into differently shaped articles. Heretofore, the use of reformed crosslinked thermoplastic articles in material handling processes, again and again, has not been known.

It is an object of this invention to provide a crosslinked thermoplastic article which can be formed into any desired shape, collapsed and later reformed into the original shape. Another object is to provide a process for the formation and reformation of a crosslinked thermoplastic article into a number of differently shaped articles. Another object is to provide a material handling process wherein the costs are substantially reduced by the employment of a reshapable and reusable crosslinked thermoplastic article. These and other objects will be readily apparent from the written description, the drawings, and the appended claims.

In accordance with this invention a process has been found for reforming a crosslinked thermoplastic article which comprises the steps of forming a crosslinkable thermoplastic polymer containing a crosslinking agent into a first shape and subsequently reforming the first shaped article into a second shaped article. Another embodiment of this invention is a reshaped crosslinked thermoplastic article of manufacture. Still another embodiment of this invention is a material handling process which employs optionally the first, or second, or any other subsequently shaped article in the form of a container.

The process of forming a crosslinked thermoplastic article in the desired first shape can be carried out by any molding process known in the art, such as rotational molding, vacuum forming, and injection molding. The first shape of the crosslinked thermoplastic article can be any shape, such as a sheet, rod, tube, box, sphere, etc. A preferred first shaped article is a hollow container prepared by rotational molding of a polymer in particulate form in combination with a suitable crosslinking agent. Any rotational molding process known in the art can be employed such as those rotational molding processes described in Modern Plastics Encyclopedia, Vol. 45, pp. 825–833 (1967), etc. Any mold rotation system or mold rotation equipment can be employed providing that both the system and the equipment provide for time and temperature conditions which insure conformity of the crosslinked polymer with the shape of the first mold cavity. In general, the rotational molding time conditions employed are essentially determined by the size, shape and mass of the article being rotationally molded. The heating and cooling cycles required are those sufficient to insure conformity of the crosslinked polymer with the shape of the mold cavity after removal therefrom. Generally, suitable mold heating and cooling cycles comprise heating a thermoplastic polymer in particulate form in the presence of a sufficient amount of crosslinking agent to a temperature of at least about 400°F in a rotational mold heating chamber generally maintained at a temperature within the range of about 500° to about 700°F for a period of about 5 to about 25 minutes. Subsequently, the rotationally molded article is cooled to a temperature which is less than the softening point temperature of the uncrosslinked thermoplastic polymer. Cooling cycles generally comprise cooling of the rotational mold cooling chamber to a temperature within the range of about 50° to about 150°F for a period of time of approximately about 5 to about 25 minutes.

The shape of the article formed in the first mold cavity can be any shape. Generally, it is preferred that the thickness of any wall of a first shaped rotationally molded article be within the range of from about 2 inches to about 0.02 inch, more preferably from about 1 inch to about 0.05 inch, and even more preferably from about 0.300 inch to about 0.100 inch. Restriction of the wall thickness to the preferred ranges is especially advantageous when the first shaped rotationally molded hollow article is to be collapsed into a smaller volume second shape prior to reforming the second shaped article into substantial conformity within the shape of the first shaped article.

Any crosslinkable thermoplastic polymer can be employed in the practice of this invention. Presently preferred crosslinkable thermoplastic polymers comprise homopolymers, copolymers, or mixtures thereof, that are derived from polymerization of 1-monoolefins having from 2 to 8 carbon atoms. Particularly preferred thermoplastic polymer compositions are selected from homopolymers of ethylene or copolymers of ethylene with minor amounts of other monomers copolymerizable therewith, for example the mono-1-olefins having 3 to 8 carbon atoms such as propylene, butene-1, hexene-1, octene-1 and the like. An especially preferred class of thermoplastic polymers employed are homopolymers and copolymers of ethylene having a density (grams/cc) within the range of from about 0.940 to about 0.970 as determined by ASTM D1505-68, a melt index of at least about 10, preferably at least about 15 and even more preferably at least about 25 or greater as determined by melt index ASTM 1238-70, a vicat softening temperature of about 240°F to about 260°F, preferably within a range of from about 255° to about 260°F as determined by ASTM D 1525-70, and a melt temperature range of from about 270° to about 290°F, preferably from about 280° to about 285°F as determined by ASTM D 2117-64.

The crosslinkable thermoplastic polymer composition employed in the practice of this invention contains a suitable crosslinking agent. Any peroxy compound which under first shape molding conditions provides a crosslinked thermoplastic polymer can be employed. Particularly preferred crosslinking agents are acetylenic diperoxy compounds which have molecular weight within the range of from about 230 to about 550 that can be represented by the formula

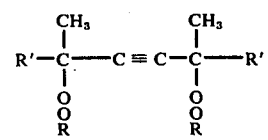

wherein each R is independently selected from the group consisting of tertiary alkyl, alkyloxycarbonyl and benzoyl radicals, and each R' is independently selected from methyl and ethyl radicals. Illustrative of suitable peroxy compounds are the following specific chemicals: 2,7-dimethyl-2,7-di(t-butylperoxy)octadiyne-3,5; 3,6-dimethyl-3,6(t-butylperoxy)octyne-4; 2,5-dimethyl-2,5-di(peroxy-n-propyl carbonate)hexyne-3; 2,5-dimethyl-2,5-di(alphacumylperoxy)-hexyne-3;2,5-dimethyl-2,5-di(peroxy beta-chloroethyl carbonate)-hexyne-3; and the like; and mixtures thereof. The amount of crosslinking agent employed can vary widely. Preferably the peroxide content constitutes any quantity which effectively causes crosslinking of the polymer at elevated temperatures. In general, the peroxide compound can be employed in combination with the thermoplastic materials in amounts within the range of from 0.1 to 10.0 parts, preferably from 0.25 to 2.5 parts, and more preferably from 0.50 to 1.0 part per 100 parts by weight of thermoplastic polymer.

Figure 2:
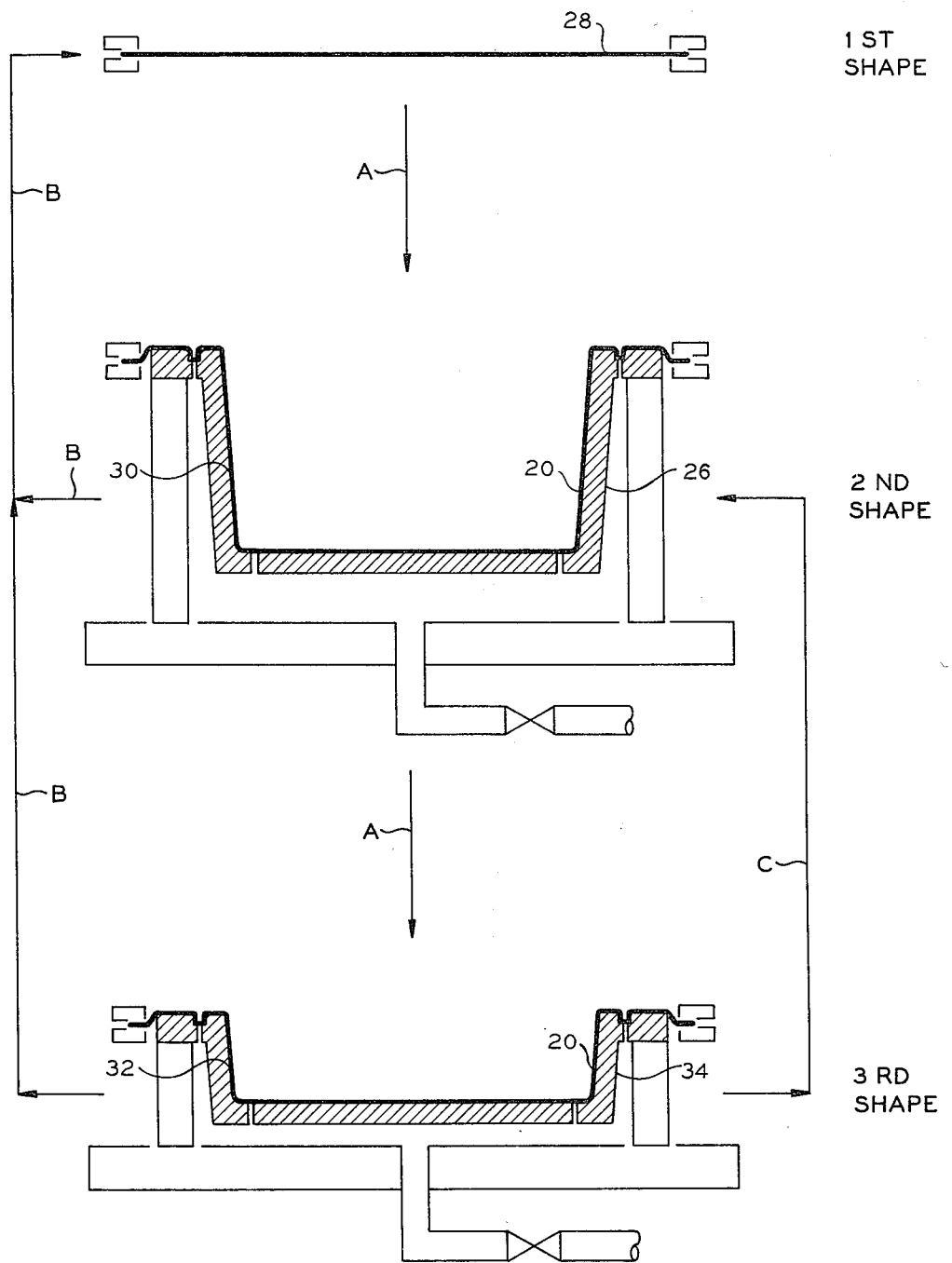

The process of this invention will be described in greater detail with reference to the accompanying drawings wherein FIG. 1 is a perspective view of a rotationally molded hollow article in its collapsed and uncollapsed form; and FIG. 2 is a schematic process sequence view wherein a first shaped crosslinked article is subsequently reformed into a second and then a third shaped crosslinked article, and/or alternatively, the second or third shaped article is reformed into the shape of the first shaped article or, alternatively, the third shaped article is reformed into the shape of the second shaped article.

Referring now to FIG. 1, a crosslinked thermoplastic hollow article 14 in the form of a Jerry can approximately 12 inches by 7½ inches wide and 9 inches high having a side wall thickness of 0.100 inch was rotationally molded in a McNeil Model No. 200-32 machine in accordance with the following conditions: 800 grams of high density polyethylene having a density of 0.965 per ASTM D1505-68 containing approximately 0.75 part of an acetylenic diperoxy crosslinking agent per 100 parts by weight of polyethylene in particulate form was rotationally molded in an oven at a temperature of approximately 600°F for approximately 12 minutes. The rotation was carried out on a major axis at 7 rpm and on a minor axis at 21 rpm. A cooling time cycle consisting of 3 minutes at 70°–75°F, 6 minutes of water spray using 70°F water, and 2 minutes at 70°–75°F was employed to cool the mold. The Jerry can 14 was removed from the rotational mold and cooled to room temperature. A 185-pound weight was placed on the top of Jerry can 14, previously heated about 300°F in a hot air oven, and the Jerry can 14 collapsed into the Jerry can form 12. The collapsed Jerry can 12, having a height of approximately 1 inch, was cooled to a room temperature within the range of from about 61° to about 72°F. The weight was removed from the collapsed can and the height of the can remained substantially unchanged at about 1 inch. Thereafter, the collapsed can was heated to about 350°F in a hot air oven for about 20 minutes, and the collapsed can reformed into the original Jerry can shape 14.

Referring now to FIG. 2, a crosslinked thermoplastic article 28 in the form of a first shaped sheet approximately 20 inches by 15 inches wide having a thickness of 0.100 inch was heated to 350°F and vacuum formed into a second shaped tray 20 having dimensions of 10¾ inches long by 9 inches wide by 1 inch deep. The second shaped tray was cooled to room temperature, and it retained its vacuum formed second shape. The second shaped tray 20 was reheated to 350°F, in the absence of any vacuum or reshaping apparatus, and the tray reformed itself into the original sheet first shape form 28. The sheet 28 was formed into second shaped tray 20 and reformed into the original first shape 28 four times, in accordance with the condition described hereinbefore, and each reformed sheet 28 corresponded to the original first shape of sheet 28.

Referring still to FIG. 2, vacuum formed second shaped tray 20 can be vacuum formed into third shaped tray 20, reformed by vacuum forming into second shaped tray 20. Alternatively, third shaped tray 20 can be reheated in the absence of any shaping apparatus, and the third shaped tray will reshape itself into the original first shape sheet 28 form.

Although in the description of the invention with reference to FIGS. 1 and 2 hereinbefore, both the collapsed Jerry can 12 and second shaped tray 20 were heated to a temperature of about 350°F, it is to be understood that the process of this invention with regard to reshaping any crosslinked thermoplastic article to conform with the original shape of a first shaped crosslinked thermoplastic article can be effectively carried out by merely heating the second, third, fourth, or fifth, etc., shaped article to a temperature at least equal to the softening point temperature of the uncrosslinked polymer employed in the preparation of the first shaped article. Reshaping a first shaped crosslinked thermoplastic article into any other shape than the original shape by the reforming process of this invention requires that the article be molded by means of suitable molding techniques as a second, third, fourth, or fifth, etc., shaped article at temperatures at least equal to the softening point temperature of the uncrosslinked polymer with subsequent cooling of the second, third, fourth, or fifth, etc., shaped article to a temperature which is less than the softening point temperature of the uncrosslinked polymer.

The material handling process of this invention comprises the optional employment of any first or second or any subsequently shaped crosslinked article in any form or shape in any such process. A preferred material handling process in accordance with this invention, referring now to FIG. 1, employs molding at a first location an uncrosslinked polymer containing a crosslinking agent in a first hollow container 14 having a first cavity volume, reforming at a second location in the first hollow container 14 into a second hollow container 12 having a second cavity volume which is smaller than the first cavity volume, shipping to a third location the thus-reformed second hollow container 12, reforming at the third location a third hollow container 14 having a third cavity volume equal to the first cavity volume, and subsequently using the cavity of the third hollow container 14 to ship an article to another location. The process described above can be employed as a convenient material handling process wherein plastic gasoline tanks for automobiles can be manufactured at a first location, reformed at said location into a collapsed gasoline tank, shipped to a third location in the collapsed form to reduce material handling and shipping costs, and thereafter reformed at the third location to correspond with the configuration, size, and volume of the gasoline can as originally formed at the first location.

As will be apparent to those skilled in the art, reasonable variations and modifications of the invention are possible within the scope of the disclosure without departing from the spirit and scope thereof.

That which is claimed is:

1. A process which comprises:

forming a first container of crosslinked polymer by molding under suitable molding conditions a blend of a crosslinkable polymer and a suitable crosslinking agent causing the polymer in the thus molded first container to crosslink, and cooling the thus molded first container to a temperature which is less than the softening point temperature of said crosslinkable polymer, said first container having a packaging cavity of a first size therein;

subsequently heating the thus cooled first container of crosslinked polymer to a temperature at least equal to said softening point temperature, applying pressure to the thus heated first container to reform the thus heated container into a second container having a packaging cavity therein which is substantially different from the packaging cavity of said first container, and cooling the thus formed second container to a temperature which is less than said softening point temperature; and subsequently heating said second container to a temperature which is at least equal to said softening point temperature in the absence of any reshaping apparatus, to permit the thus heated second container to reform itself into the original configuration of said first container.

2. A process in accordance with claim 1 wherein said first container is reformed into said second container by the at least partial collapse of said first container by the pressure being applied thereto.

3. A process in accordance with claim 2 wherein said second container is shipped from a first location to a distant second location, and said second container is reformed at said second location into said first container.

4. A process in accordance with claim 3 further comprising introducing into the packaging cavity of the thus reformed first container at said second location material to be shipped to another location different from said second location, shipping the thus reformed first container containing said material therein to said another location.

5. A process in accordance with claim 4 further comprising withdrawing at said another location said material from the thus shipped reformed first container, and then heating the resulting empty reformed first container to a temperature which is at least equal to said softening point temperature, applying pressure to be thus heated empty reformed first container to at least partially collapse it into the configuration of said second container, cooling the resulting reformed second container to a temperature below said softening point temperature, and shipping the resulting cooled reformed second container to a location distant from said another location.

6. A process in accordance with claim 5 wherein said crosslinkable polymer is selected from the group consisting of homopolymers and copolymers of 1-monoolefins having from 2 to 8 carbon atoms per molecule.

7. A process in accordance with claim 5 wherein said crosslinkable polymer is selected from the group consisting of homopolymers of ethylene and copolymers of ethylene and at least one other 1-monoolefin having from 3 to 8 carbon atoms per molecule.

8. A process in accordance with claim 7 wherein said crosslinkable polymer has a density in the range of about 0.940 to about 0.970 as determined by ASTM D 1505-68, a melt index of at least 10 as determined by ASTM 1238-70.

9. A process in accordance with claim 8 wherein said crosslinking agent is selected from acetylenic diperoxy compounds having a molecular weight within the range of from about 230 to about 550 and represented by the formula

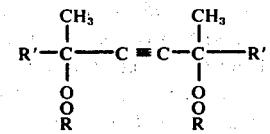

wherein each R is independently selected from the group consisting of tertiary alkyl, alkyloxycarbonyl or benzoyl radicals, and each R' is independently selected from methyl and ethyl radicals.

10. The at least partially collapsed second container prepared in accordance with claim 2, having the characteristic of returning to the configuration of said first container upon heating to a temperature at least equal to said softening point temperature in the absence of any reshaping apparatus.

11. A process which comprises:

forming a sheet of crosslinked polymer by molding under suitable molding conditions a blend of a crosslinkable polymer and a suitable crosslinking agent causing the polymer in the thus molded sheet to crosslink, and cooling the thus molded sheet to a temperature which is less than the softening point temperature of said crosslinkable polymer;

subsequently heating the thus cooled sheet of crosslinked polymer to a temperature at least equal to said softening point temperature, applying pressure to the thus heated sheet of crosslinked polymer to reform the thus heated sheet of crosslinked polymer into a first container having a first packaging cavity, and cooling the thus formed first container to a temperature which is less than said softening point temperature; and subsequently heating said first container to a temperature which is at least equal to said softening point temperature, applying pressure to the thus heated first container to reform said first container into a second container having a second packaging cavity different from said first packaging cavity, cooling the thus formed second container to a temperature which is less than said softening point temperature;

subsequently heating said second container to a temperature which is at least equal to said softening point temperature in the absence of any reshaping apparatus, to permit the thus heated second container to reform itself into the original configuration of said sheet.

12. A process which comprises:

forming a sheet of crosslinked polymer by molding under suitable molding conditions a blend of a crosslinkable polymer and a suitable crosslinking agent causing the polymer in the thus molded sheet to crosslink, and cooling the thus molded sheet to a temperature which is less than the softening point temperature of said crosslinkable polymer;

subsequently heating the thus cooled sheet of crosslinked polymer to a temperature at least equal to said softening point temperature, applying pressure to the thus heated sheet of crosslinked polymer to reform the thus heated sheet of crosslinked polymer into a container having a packaging cavity, and cooling the thus formed container to a temperature which is less than said softening point temperature, said sheet being reformed to said container at a first location;

introducing material to be shipped to a distant second location into said container before said container is shipped to said second location;

shipping said container containing said material to said second location;

removing said material from said container at said second location; and subsequently heating said container from which said material has been removed to a temperature which is at least equal to said softening point temperature in the absence of any reshaping apparatus, to permit the thus heated container to reform itself into the original configuration of said sheet.

13. A process in accordance with claim 12 wherein said container is reformed to said sheet at said second location.

14. A process in accordance with claim 12 wherein said crosslinkable polymer is selected from the group consisting of homopolymers and copolymers of 1-monoolefins having from 2 to 8 carbon atoms per molecule.

15. A process in accordance with claim 12 wherein said crosslinkable polymer is selected from the group consisting of homopolymers of ethylene and copolymers of ethylene and at least one other 1-monoolefin having from 3 to 8 carbon atoms per molecule.

16. A process in accordance with claim 5 wherein said crosslinkable polymer has a density in the range of about 0.940 to about 0.970 as determined by ASTM D 1505-68, a melt index of at least 10 as determined by ASTM 1238-70.

17. A process in accordance with claim 6 wherein said crosslinking agent is selected from acetylenic diperoxy compounds having a molecular weight within the range of from about 230 to about 550 and represented by the formula

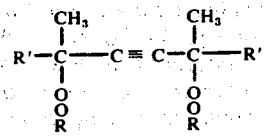

wherein each R is independently selected from the group consisting of tertiary alkyl, alkyloxycarbonyl or benzoyl radicals, and each R' is independently selected from methyl and ethyl radicals.

* * * * *

UNITED STATES PATENT AND TRADEMARK OFFICE
CERTIFICATE OF CORRECTION

PATENT NO. : 3,984,516
DATED : October 5, 1976
INVENTOR(S) : Guy E. Carrow

It is certified that error appears in the above-identified patent and that said Letters Patent are hereby corrected as shown below:

Column 5, line 53, after "to" delete "be" and insert -- the --.
Column 7, line 17, delete -- 1-monoolefins 2 8 --.

Signed and Sealed this

Eleventh Day of September 1979

[SEAL]

Attest:

LUTRELLE F. PARKER
Attesting Officer    Acting Commissioner of Patents and Trademarks